UNITED STATES PATENT OFFICE.

FREDERICK GUTZKOW, OF SAN FRANCISCO, CALIFORNIA.

PROCESS OF PREPARING SULPHATE OF SILVER.

SPECIFICATION forming part of Letters Patent No. 401,828, dated April 23, 1889.

Application filed February 11, 1889. Serial No. 299,504. (No specimens.)

*To all whom it may concern:*

Be it known that I, FREDERICK GUTZKOW, a citizen of the United States, and a resident of San Francisco, State of California, have invented certain Improvements in the Process of Preparing Sulphate of Silver; and I declare that the following is a full, clear, and exact specification and description of the invention, which will enable others skilled in the art to which it belongs to make and use the same.

My invention refers to the preparation of crystals of sulphate of silver in parting bullion by sulphuric acid, and is an improvement on a process for preparing such crystals for which I was granted Letters Patent No. 85,005 on the 15th day of December, 1868. Said process was based on the discovery that sulphate of silver will crystallize as monosulphate from its solution in sulphuric acid of 58° Baumé, and as bisulphate from acid of higher concentration, and it consisted, essentially, in mixing the hot and highly-concentrated solution obtained in the refining-pot with sulphuric acid of 58° Baumé and 250° Fahrenheit. The specification stated the volume of the weaker acid to be ten cubic feet for a thousand ounces of silver, and the claim limited it to between five and twenty cubic feet for that weight of silver. Heretofore the great amount of acid required, the difficulty of heating it by fire, owing to sediment present, and of pumping it, owing to its character, has prevented the adoption of my process in several refineries—for instance, in those connected with the United States mints.

In my improved process the volume of weaker acid required is considerably below five cubic feet for a thousand ounces of silver, and may even entirely be dispensed with. I achieve this by effecting the dilution by a jet of steam.

I operate as follows: I dissolve the bullion by sulphuric acid in a cast-iron pot in the usual manner, and add to the finished solution some free acid, of more or less concentration, for the purpose of settling, as it is practiced at the United States mints and elsewhere. The clarified solution I siphon into another pot or pan made of iron or lead. Here I introduce into the still hot solution a jet of steam issuing from a nozzle made of lead-pipe, through a small orifice of about one-eighth of an inch diameter. I have found that while dilution by water is a dangerous operation, dilution by steam in the manner described is quite safe, that the condensation is perfect, and that the absorption of the steam causes the heat to maintain itself at a high temperature, as it is desirable that it should do, in order that the acid during dilution may retain its highest possible dissolving-power for sulphate of silver. The introduction of steam is continued until the operator observes that a sample placed in a test-tube and cooled by water will separate the sulphate of silver in the characteristic hard yellow crystals of monosulphate, and no longer congeal into a pulp or jelly of bisulphate. Then the nozzle, which may advantageously be connected with the steam-pipe by a rubber hose, is lifted out, the steam is shut off, and the solution is allowed to cool, which may be accelerated by known devices. The crystals will be found to coat the sides of the vessel. The mother-liquor, consisting, essentially, of free acid, is run off to a reservoir. Part of it is utilized for settling the strong solution obtained in another refining operation. The rest is intermixed with the fresh acid and used for dissolving bullion, greatly diminishing the amount of fresh acid required. As the economy in acid for dissolving bullion is carried to a different degree in the various refineries, each refiner must judge how much of the mother-liquor or mother-acid shall serve for refining or for settling. If preferred, part of that portion reserved for settling may be placed in the vessel where the crystals separate to receive the hot and settled strong solution. The crystals of sulphate of silver are removed to a lead-lined tank of the same construction as those used at the United States mints for reducing silver chloride by zinc. Sheets of old iron are intermixed, and some water is added. The sulphate of silver will rapidly be converted into metallic silver, very well adapted for further operations. The solution of ferrous sulphate formed is free of silver and runs to waste. This treatment may be modified, when the bullion operated on contains copper, by leaching the easilysoluble cupric sulphate from the much less soluble silver sulphate by water previously to the introduction of the iron, and by precipitating the silver by salt or copper, there being in the solution thus obtained only little silver dissolved, the great bulk remaining in the tank.

Having thus described my invention, what I claim, and desire to secure by Letters Patent, is this:

In the process of refining silver bullion, the preparation of crystals of sulphate of silver by diluting the hot solution of sulphate of silver in sulphuric acid, by means of a steam-jet, to such concentration that on cooling the crystals will separate as a monosulphate.

FREDERICK GUTZKOW.

Witnesses:
HANS C. BEHR,
E. J. MOLERA.